Nov. 18, 1958     M. R. OXFORD ET AL     2,860,890
VELOCIPEDE WITH RECIPROCATING SEAT
Filed March 9, 1956
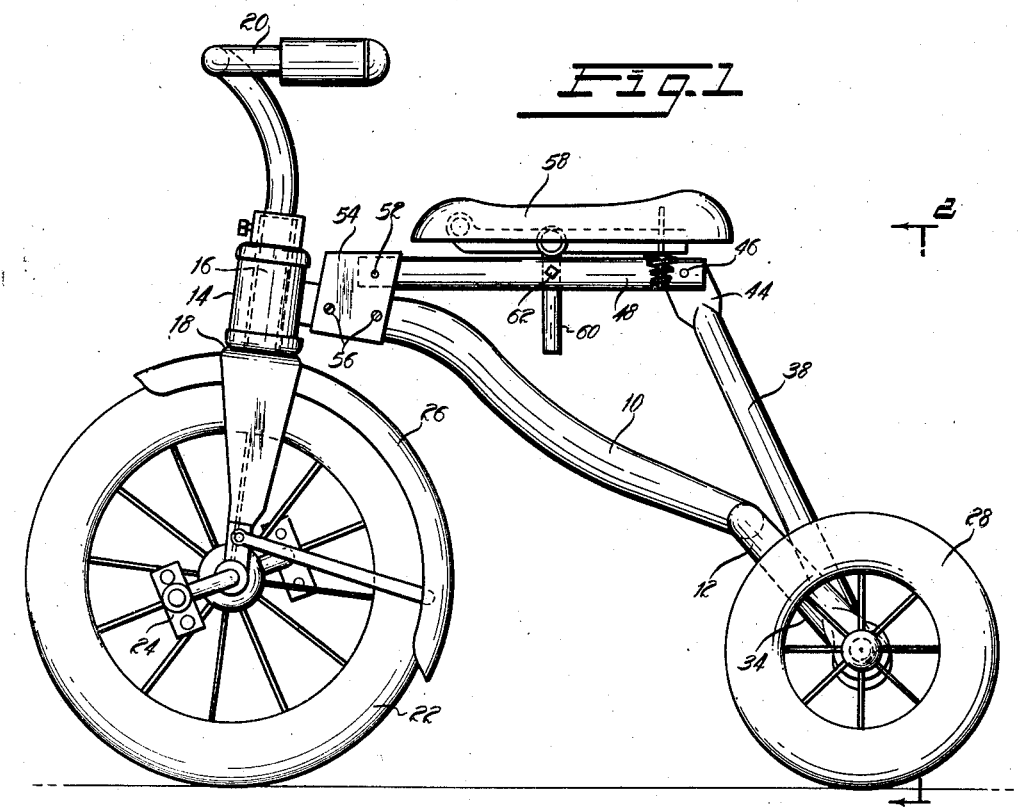
INVENTORS
M. R. Oxford
E. T. McBride
BY Diggins & LeBlanc
ATTORNEYS

United States Patent Office 2,860,890
Patented Nov. 18, 1958

2,860,890

VELOCIPEDE WITH RECIPROCATING SEAT

Malcom R. Oxford and Edward T. McBride,
Selma, Ala.

Application March 9, 1956, Serial No. 570,629

1 Claim. (Cl. 280—226)

This invention relates to velocipedes and more particularly relates to a velocipede having a seat which has a vertical reciprocating motion when the velocipede is propelled.

While standard velocipedes have been marketed in various forms for an extremely long period of time, to our knowledge no one has ever provided a velocipede wherein the peddling action which propells the velocipede also imparts a vertical reciprocating motion to the seat. Particularly we are not aware that a velocipede has ever been produced wherein this vertical seat motion may be eliminated at the will of the operator. While various large and small toys have been marketed with provision for a rocking or vertical motion, to our knowledge none of these has ever been of the simple velocipede type and none have provided a means for eliminating the vertical motion when desired. This type of motion as applied to a velocipede simulates the motion of a horse in the eyes of children and renders the velocipede a considerably more attractive toy, particularly where the action may be eliminated by a simple adjustment which even a child may make.

It is accordingly a primary object of the present invention to provide a velocipede having a seat which is caused to reciprocate vertically upon propelling the velocipede.

It is another object of the invention to provide a velocipede having a seat which reciprocates vertically upon propelling of the velocipede and having means for eliminating this motion by a simple adjustment.

It is another object of the invention to provide a velocipede which may be used both as a standard velocipede and as a velocipede having a seat which reciprocates vertically upon pedaling of the same.

It is a still further object of the invention to provide a velocipede of the foregoing type having a simple, sturdy and fool proof arrangement for accomplishing the vertical reciprocating motions.

These and further objects and advantages of the invention will become apparent upon reference to the following specification and claim and appended drawings wherein:

Figure 1 is a side elevation of a velocipede constructed according to the invention;

Figure 2 is a rear elevation of the seat actuating mechanism of the velocipede of Figure 1 taken along the line 2—2 of Figure 1;

Figure 3 is a vertical cross section through the rear axle of the velocipede of the invention showing a means of selectably providing the seat reciprocation;

Figure 4 is a vertical elevation of the pin shown in Figure 3;

Figure 5 is a vertical elevation of the pin shown in Figure 3 from a position 90° removed from that in Figure 4; and Figure 6 is a vertical section through the hub of one of the wheels.

Referring to Figure 1 there is shown a velocipede having a body frame bar 10 which is attached at its rear end to a conventional U-shaped rear axle frame member 12 and which is attached at its front end to a conventional socket 14. The socket 14 receives the pinion 16 of a conventional fork 18 and the pinion 16 extends upwardly to join the handle bars 20. A front wheel 22 is carried by the fork 18 in a conventional manner and is provided with pedals 24 and a fender 26.

A pair of rear wheels 28 shown as having spokes 29 are rotatably mounted upon an axle 30 which is received in bearings 32 carried by the downwardly extending legs 34 of the U-shaped frame member 12. The center of the rear axle 30 is off-set to form a crank 36 on which is mounted the lower end 40 of seat actuating bar 38. The lower end 40 of the seat actuating bar 38 is connected to the crank 36 by means of a suitable bearing 42 and this bearing as well as bearings 32 may be ball bearings or any other suitable type.

The upper end 44 of seat actuating bar 38 is pivoted at 46 to the rear end of seat support 48, both ends 40 and 44 of the seat actuating bar 38 being flattened in this particular embodiment of the invention. The seat support 48 comprises a tubular member slotted at 50 to receive the flattened end 44 of seat actuating bar 38 which is pivoted thereto by means of pin 46. The forward end of seat support 48 is pivoted at 52 to a U-shaped saddle bracket 54 bolted to the forward and uppermost end of the body frame bar 10 by means of screws 56. A conventional seat 58 is mounted upon the seat support 48 by means of stud 60 and set screw 62.

In order to cause rear axle 30 to rotate so that seat 58 may be actuated by means of crank 36, one of the rear wheels 28 is rigidly secured to the rear axle 30. In order to permit elimination of the vertical reciprocation of the seat it is desirable that this connection be removable. Referring to Figures 3, 4, 5 and 6 there is shown one method of forming such a connection. According to this embodiment of the invention the hub 64 of one of the rear wheels 28 is provided with a pair of apertures 66 which are capable of alignment with a diametrical bore 68 in the rear axle 30. A pin having a head 70 and shank 72 is received in the apertures 66 and bore 68 to lock the wheel to the axle 30 so that the rotation of the wheel which results from peddling the velocipede causes the rear axle 30 to rotate. In order to provide easy removability of this connection the shank 72 of the pin is bifurcated at 74 and a link 76 is pivotally mounted within the bifurcations by means of a pivot pin 78.

In order to lock the rear wheel to the rear axle a spring 80 is slipped over the shank 72 of the pin and the link 76 is rotated so that its longitudinal axis is in line with the axis of the shank 72, as seen in Figures 4 and 5. In this condition the pin is inserted into the aperture 66 and bore 68 and the spring 80 compressed until the lowermost end 82 of link 76 clears the hub 64. The link 76 is then rotated until its longitudinal axis is transverse of that of the shank 72 and the spring 80 then forces the side of link 76 against the hub 64 to lock the pin in position and to lock the wheel to the axle. The connection between the wheel and axle may be broken by simply reversing the foregoing procedure and pressing the head 70 of the pin until the link 76 can be returned to the position shown in Figures 4 and 5, whereupon the pin may be withdrawn. When the pin is withdrawn the wheel is held on the axle in the conventional manner by a cotter pin 77. It will be appreciated by those skilled in the art that various other arrangements may be used to lock a rear wheel to the rear axle 30 and such arrangements are intended to be within the scope of this invention. It will also be apparent that both rear wheels may be locked to the rear axle if so desired and the invention is not intended to be limited to the case where only one rear wheel is so locked.

It is believed that the operation of the device will be apparent from the foregoing description thereof. In brief, when one or more rear wheels is connected to the rear axle, pedaling of the velocipede causes rotation of the rear axle and the crank 36 imparts a vertical reciprocating motion to the seat 58 which oscillates about the pivot 52 in saddle bracket 54. When the connection between the rear wheel and the rear axle is removed the rear axle is no longer driven, so that the crank 36 and seat operating bar 38 are stationary and the velocipede is thus converted into a standard type. The entire structure is simple and fool proof and capable of control by even young childern.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come wtihin the meaning and range of equivalency of the claim are therefore intended to be embraced therein.

What is claimed and desired to be secured by United States Letters Patent is:

A velocipede having a frame, a fork pivoted to said frame and carrying a front wheel, pedals mounted on the front wheel, a pair of rear wheels rotatably mounted on an axle carried by said frame, means releasably connecting one of said rear wheels to said axle for rotation therewith, a seat carried by a seat support pivoted to said frame adjacent said fork, a crank on said axle, and a member connecting said crank and said seat support to reciprocate said seat on rotation of said axle, said frame comprising a bar pivotally receiving said fork and having a U-shaped member rotatably supporting said axle, a bracket mounted on said frame adjacent the pivotal connection of said fork thereto and a pivot in said bracket pivotally securing said seat support to said frame, said bracket being a U-shaped member receiving said seat support in the bight thereof, the legs in said U-shaped bracket being secured on both sides of said bar.

References Cited in the file of this patent

UNITED STATES PATENTS

| | | |
|---|---|---|
| D. 146,645 | Donaldson | Apr. 22, 1947 |
| 1,355,752 | Bond | Oct. 12, 1920 |
| 1,559,276 | Nelson | Oct. 27, 1925 |
| 1,587,930 | Wetzel | June 8, 1926 |
| 1,642,591 | Morris | Sept. 13, 1927 |
| 2,546,822 | Herrick | Mar. 27, 1951 |